UNITED STATES PATENT OFFICE

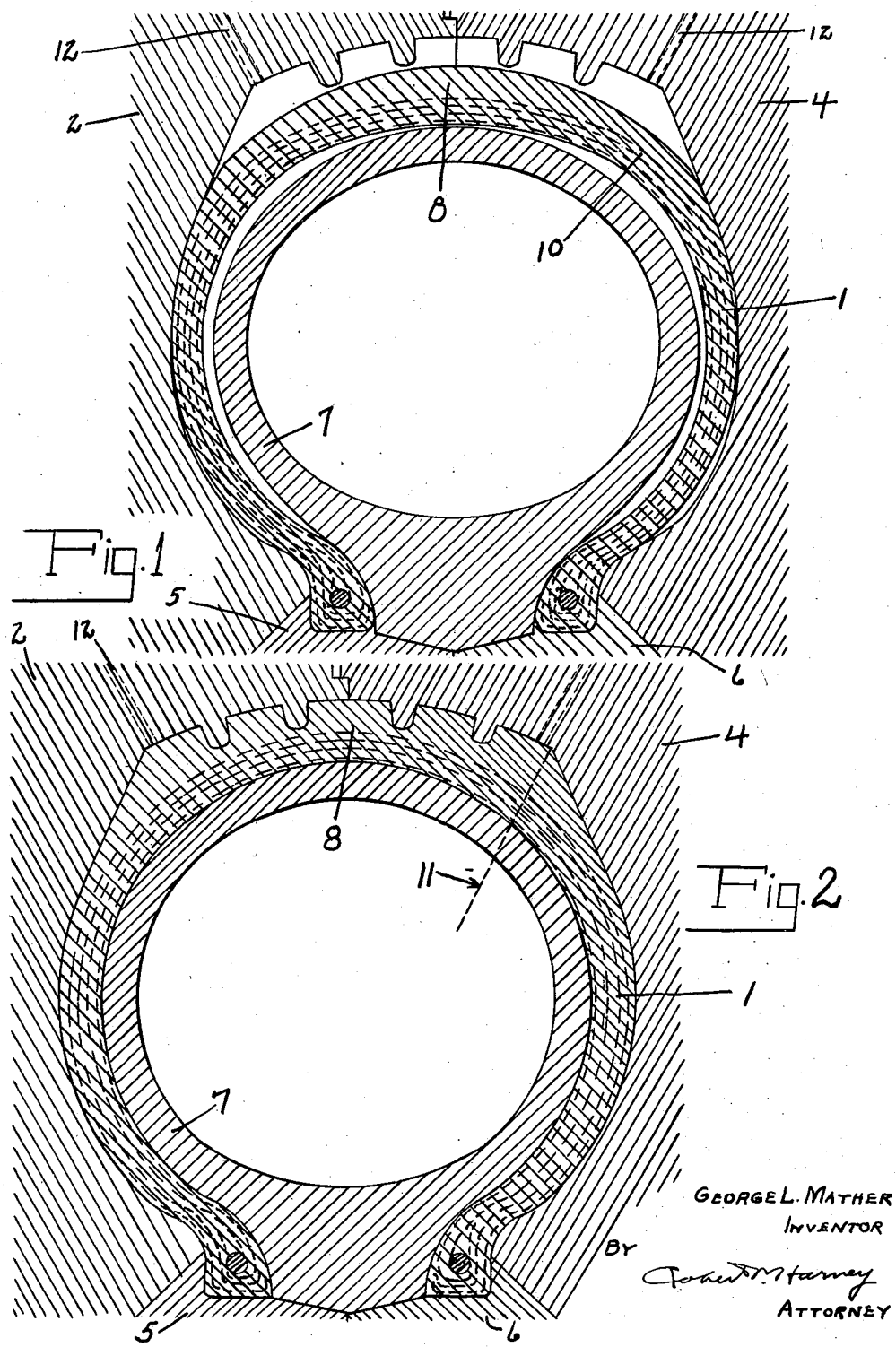

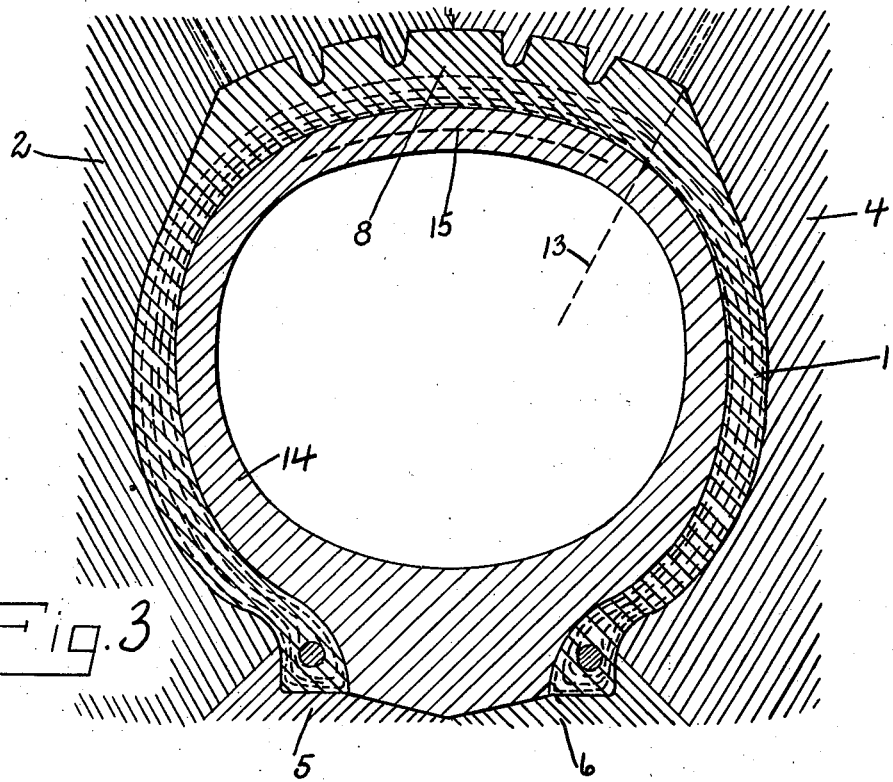
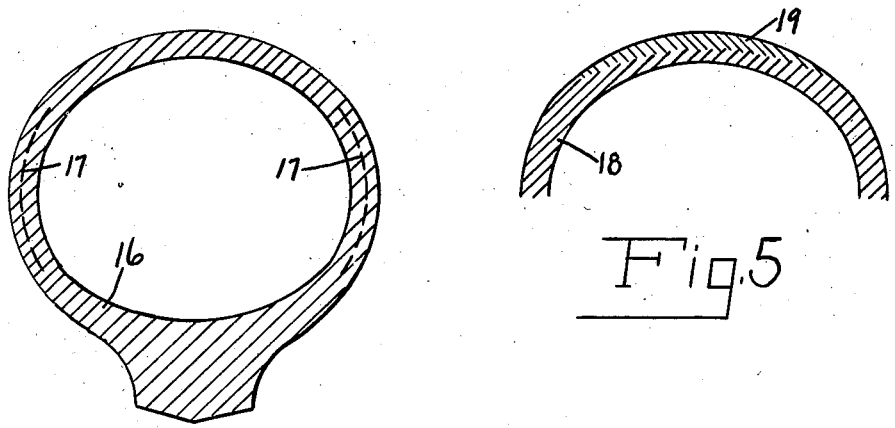

GEORGE L. MATHER, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

MANUFACTURE OF PNEUMATIC TIRE CASINGS

Application filed March 4, 1927. Serial No. 172,680.

My invention relates to the curing of pneumatic tire casings and more particularly to an expansible core upon which the casing is supported during vulcanization.

These cores usually take the form of an annular rubber tube which is expanded by fluid pressure. Such tubes or cores tend to assume a circular cross section when expanded regardless of their original shape and when used in casings which are non-circular in cross section this tendency results in an improper distribution of rubber in the finished tire casing as will be more fully explained. It is the principal object of my invention to provide an expansible core which will expand in a non-circular manner substantially complementary to the shape of the casing and the mold in which the latter is cured to thereby secure a properly balanced casing of predetermined proportions. Other and further objects will be apparent from the following specification and claims.

For a clear understanding of my invention a consideration of the action of the core of the prior art when used in a non-circular casing is necessary and in the accompanying drawings, Figure 1 is a diagrammatic section showing a conventional core and semi-flat casing assembled in a mold, prior to expansion of the core, Figure 2 is a section, similar to Figure 1, with the core expanded, Figure 3 is a similar section but showing a core embodying my invention in expanded position, Figure 4 is a detail section of a modified form of my improved core and Figure 5 is a fragmentary section showing an alternative manner of controlling the expansion of the core.

Referring to the drawings 1 designates a tire casing of the so-called semi-flat type, that is a casing transversely elongated in cross section. The mold halves are diagrammatically shown at 2 and 4 and conventional bead rings are indicated at 5 and 6. In Figure 1 a conventional fluid pressure core 7 is shown positioned in the casing. The core 7 is normally of elliptical cross section and is adapted to be expanded through a conventional valve, not shown. As previously stated the core 7 while initially of elliptical form tends to expand into circular form with the result that when fluid pressure is applied to the interior of the core the crown portion or tread, 8 of the casing 1 is driven against the mold walls in advance of the shoulder portions 10. The result as shown in Figure 2 is that a portion of the tread rubber at the crown of the casing is driven downwardly into the shoulders 10 thereby decreasing the thickness of the tread portion of the casing and unduly increasing the thickness of the shoulders as indicated at the dotted line 11. This displacement of the rubber extends in varying degrees down the side wall of the tire. As shown in Figure 2 the core has approached circular form with the result that while the outside of the casing is molded in semi-flat form the interior casing is nearly round, this difference in the exterior and interior shape of the casing being accounted for by the thinning of the tread and the thickening of the shoulder. Attempts have been made to remedy this condition by increasing the size of the vents 12 provided in the mold halves at the shoulders. While it is possible to thus decrease the thickness at the shoulders, by permitting the rubber to escape through the vents, it is obvious that the crown of the casing still engages the mold in advance of the shoulders and unless a relatively excessive amount of rubber is used the result is a thin tread as before. Furthermore the results so obtained are not uniform since the flow of rubber through the vents varies with the condition of the walls of the vents and the plasticity of the rubber.

I propose to remedy the objections pointed out by controlling the expansion of the core itself, that is providing, in the case illustrated, a core that expands as an ellipse rather than a circle so that the shoulders and side walls of the casing contact with the mold simultaneously with the crown, with the result that the disposition of the rubber as originally built into the casing is maintained and a balanced casing of proper thickness at tread, shoulders and side wall is obtained.

As shown in Figure 3 I obtain this result by using a core 14 having incorporated in its crown portion a circumferential strip of bias cut fabric 15. The width of the strip 15 will depend on the "flatness" of the casing to be cured and it functions to retard the expansion of the core at the crown causing the core to expand as an ellipse. The degree of this retarding action (as contrasted with its extent, which is controlled by the width of the strip) may be nicely controlled by the angle of the bias on which the fabric is cut. As shown in Figure 3 the core has expanded in a shape substantially complemental to the shape of the mold, giving normal thickness to the tread 8, the shoulders at 13 and the side walls of the casing; both the exterior and interior cross-sectional perimeters of the casing being generally semi-flat or elliptical.

In Figure 4 I have shown my invention applied to secure a core 16 that will expand more readily at the crown than at the sides to produce an oval tire having its major axis in the plane of the annulus. This is accomplished as shown by placing strips 17 in the side walls of the core. It will be understood that my invention is not limited to any particular cross sectional shape of tire and that my invention provides means broadly to control the expansion of the core to secure any desired shape of tire.

In Figure 5 I have shown an alternative manner of controlling the expansion of the core and as there shown I form the core of two different stocks 18 and 19, the former being the usual core stock while 19 is compounded to be relatively inelastic. The two stocks are vulcanized to form a unitary core, but the stock 19 tends to retard the expansion as in the case of fabric 15. Other materials than bias fabric and stiff rubber stock may of course be used to carry out the principle of my invention and I do not limit myself to the materials shown. Under suitable conditions satisfactory results may be achieved by giving that portion of the core, the expansion of which is to be limited, a longer cure or by making it thicker than the other portions, but a more exact control of the degree of expansion is obtainable through the use of the bias fabric or a similar material.

I claim:

1. The method of molding semi-flat tire casings during cure which comprises applying expanding pressure against the interior walls and crown of the casing to force said portions of the casing respectively against the side portions and crown of the mold cavity substantially simultaneously and with uniform pressure whereby excessive flow of rubber to the casing shoulders is prevented and the interior of the casing is molded in semi-flat cross-sectional contour.

2. The method of molding semi-flat tire casings during cure which comprises inserting a fluid pressure core within the casing, applying fluid pressure to the interior of the core and retarding the expansion of the crown portion of the core to an extent sufficient to cause the expanding core to force the side-walls and crown of the casing respectively against the side portions and crown of the mold cavity substantially simultaneously and with uniform pressure whereby excessive flow of rubber to the casing shoulders is prevented and the interior of the casing is molded in semi-flat cross-sectional contour.

In testimony whereof I have signed my name to the above specification.

GEORGE L. MATHER.